United States Patent
Loyd et al.

(10) Patent No.: US 6,966,749 B2
(45) Date of Patent: Nov. 22, 2005

(54) PUMP WITH SEAL RINSING FEATURE

(75) Inventors: Casey Loyd, Pomona, CA (US); Pedro Vargas, Pomona, CA (US); Buzz Loyd, Pomona, CA (US)

(73) Assignee: California Acrylic Industries, Pomana, CA (US)

( * ) Notice: Subject to any disclaimer, the term of this patent is extended or adjusted under 35 U.S.C. 154(b) by 22 days.

(21) Appl. No.: 10/752,856

(22) Filed: Jan. 7, 2004

(65) Prior Publication Data
US 2005/0147491 A1 Jul. 7, 2005

(51) Int. Cl.[7] .............................................. F04D 29/10
(52) U.S. Cl. ...................... 415/111; 415/204; 415/231; 416/198 R
(58) Field of Search ........................ 415/111–113, 204, 415/206, 230, 231; 416/175, 198 R; 417/423.14

(56) References Cited

U.S. PATENT DOCUMENTS

| | | | |
|---|---|---|---|
| 3,304,875 A | * | 2/1967 | Copeland ............... 417/423.14 |
| 3,656,861 A | * | 4/1972 | Zagar ..................... 415/109 |
| 4,475,868 A | | 10/1984 | Renger |
| 4,921,400 A | | 5/1990 | Niskanen |
| 5,096,396 A | | 3/1992 | Welch |
| 5,180,280 A | | 1/1993 | Honda |
| 5,286,162 A | | 2/1994 | Veres |
| 5,779,444 A | | 7/1998 | Onigata et al. |
| 5,827,042 A | * | 10/1998 | Ramsay ................... 415/112 |
| 5,997,246 A | * | 12/1999 | Humbad ................... 415/119 |
| 6,050,772 A | | 4/2000 | Hatakeyama et al. |
| 6,126,392 A | | 10/2000 | Sabini |
| 6,648,595 B2 | | 11/2003 | Laing |

* cited by examiner

*Primary Examiner*—Ninh H. Nguyen
(74) *Attorney, Agent, or Firm*—Denton L. Anderson; Sheldon & Mak

(57) ABSTRACT

A centrifugal pump has a pump case and a rotatable impeller disposed within the pump case. A central aperture is defined within the rearward wall of the pump case to facilitate the connection of an impeller drive shaft to the impeller. A drive shaft seal is disposed within the central aperture to seal the impeller drive shaft to the pump case. At least one or more grooves are defined in the rearward wall of the pump case to carry liquids to and from the drive shaft seal. One or more radial ridges are disposed on the rearward side of the impeller to encourage liquids to flow within the grooves to and from the drive shaft seal to continuously wash away precipitates around the seal and to cool the seal.

19 Claims, 2 Drawing Sheets

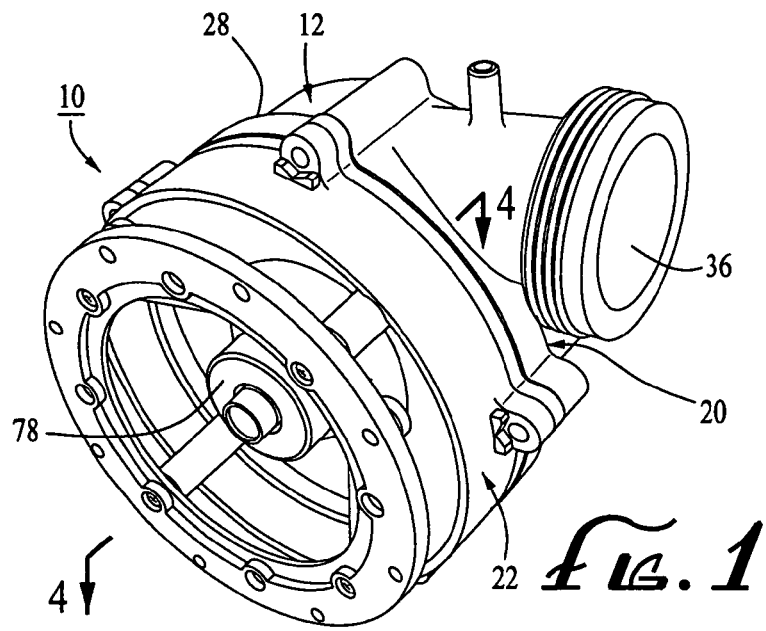
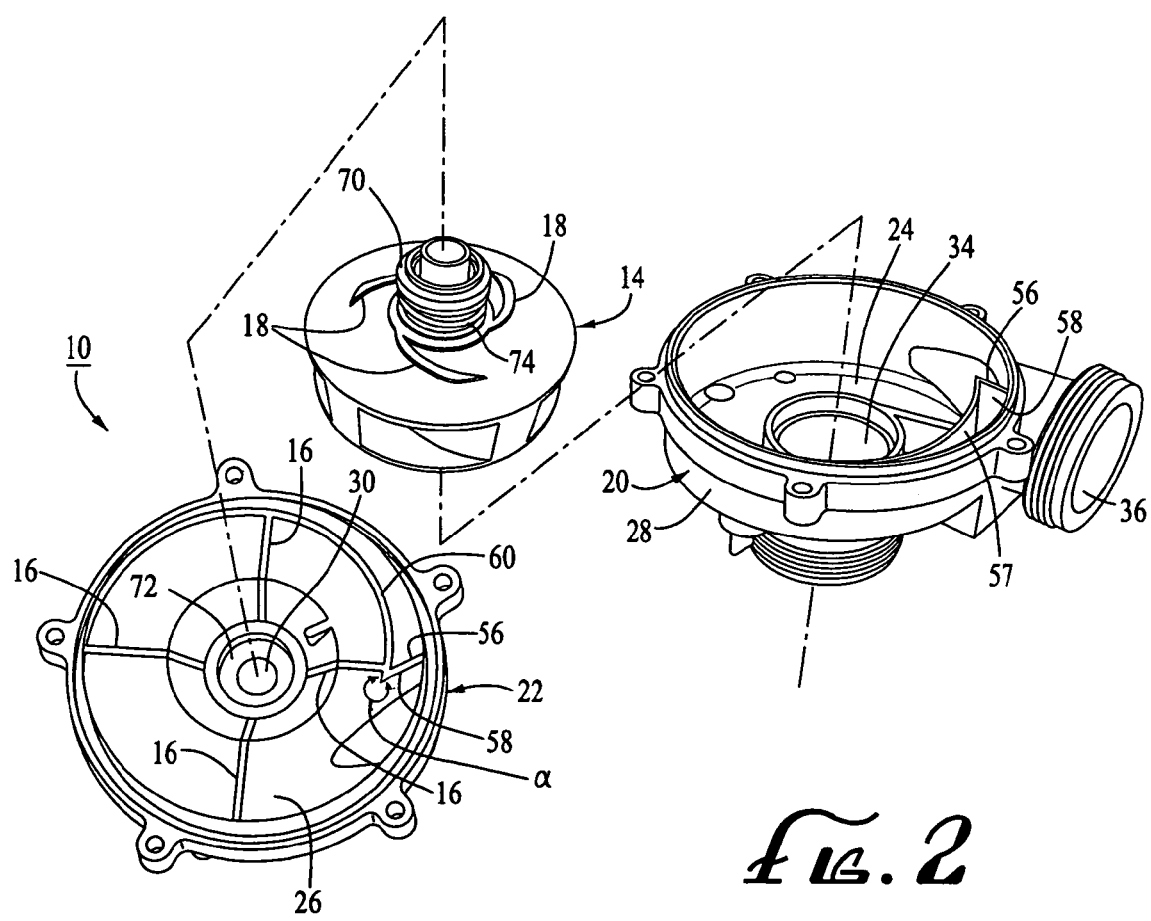

PUMP WITH SEAL RINSING FEATURE

BACKGROUND OF THE INVENTION

Centrifugal pumps used for recirculating water in water recreational apparatuses, such as spas, hot tubs, swimming pools and recirculating bathtubs, are prone to fouling and chemical build-up within the pump case. The principal problem area is around the seal which seals the impeller drive shaft to the pump case. Such fouling is the result of the precipitation of salts and other chemicals dissolved within the water.

Also, the seal which seals the impeller drive shaft to the pump case is prone to failure due to heat build-up at the seal.

Thus, there is a need for a centrifugal pump which avoids this problem in the prior art.

SUMMARY OF THE INVENTION

The invention satisfies this need. The invention is a centrifugal pump comprising (a) a pump case having a forward wall and a rearward wall, the rearward wall defining a central opening for a drive shaft; (b) a rotatable impeller disposed within the pump case, the impeller having a center, a support wall and impeller blades, the support wall having a forward side and a rearward side; (c) a drive shaft disposed throughout the central opening of the rearward wall of the pump case and attached to the rearward side of the impeller support wall for rotating the impeller; (d) a primary drive shaft seal disposed around the central opening of the rearward wall of the pump case to seal the drive shaft to the pump case; (e) at least one groove defined in the rearward wall of the pump case, the at least one groove radiating outwardly from the primary drive shaft seal to carry liquids to and from the primary drive shaft seal; and (f) at least one radial ridge disposed on the rearward side of the support wall of the impeller.

DESCRIPTION OF THE DRAWINGS

These and other features, aspects and advantages of the present invention will become better understood with reference to the following description, appended claims and accompanying drawings where:

FIG. 1 is a perspective view of a centrifugal pump having features of the invention;

FIG. 2 is an exploded view of the centrifugal pump illustrated in FIG. 1;

DETAILED DESCRIPTION

Figure 3:
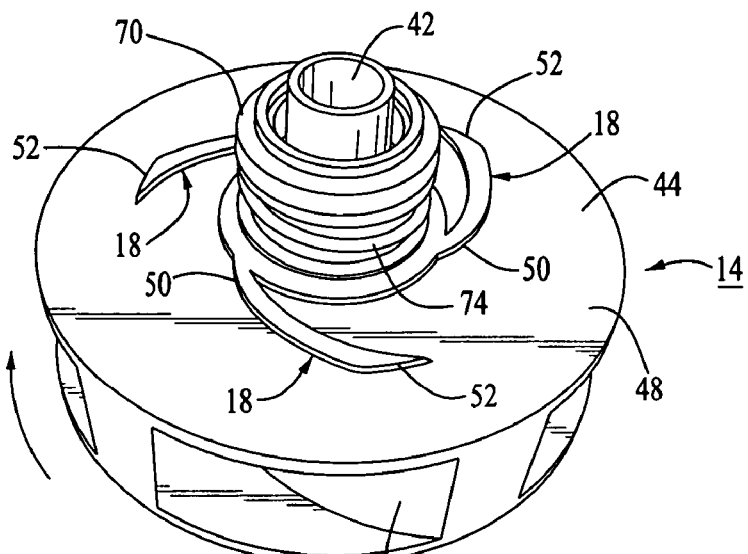
FIG. 3 is a perspective view of an impeller useable in the centrifugal pump illustrated in FIG. 1.
Figure 4:
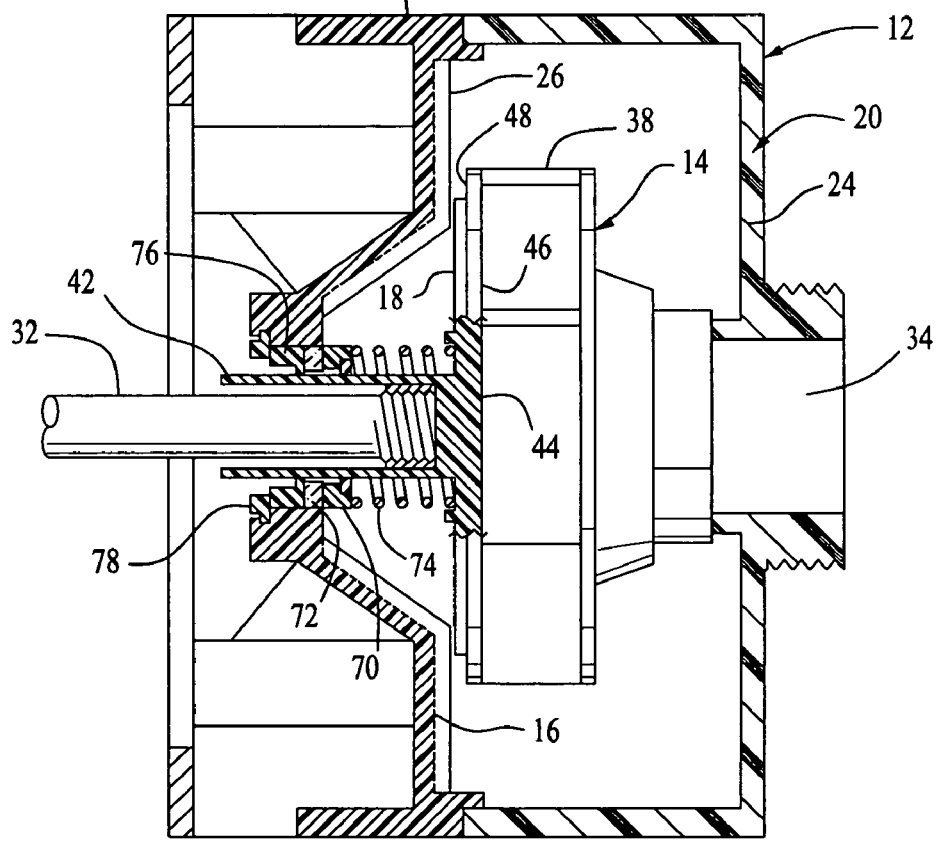
FIG. 4 is a cross-sectional view of the pump illustrated in FIG. 1.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a centrifugal pump 10 having a pump case 12 and a rotatable impeller 14 disposed therein. At least one groove 16 is defined in one wall of the pump case 12, at least one radial ridge 18 is disposed on the side of the impeller 14 facing the at least one groove 16.

As illustrated in the drawings, the pump case 12 typically consists of two portions, a forward portion 20 and a rearward portion 22. The forward portion 20 has a forward wall 24 and the rearward portion 22 has a rearward wall 26. The pump case 12 also comprises a generally circular side wall 28. The rearward wall 26 defines a central opening 30 for admitting a drive shaft 32 into the interior of the pump case 12 to rotate the impeller 14. The pump case 12 is typically made from a metal or plastic material, depending upon the service for which the pump 10 is designed.

The forward wall 24 of the pump case 12 defines a suction opening 34 for allowing fluid to flow into the interior of the pump case 12. The side wall 28 of the pump case 12 defines a discharge opening 36 for allowing fluids to flow out of the pump case 12.

The impeller 14 is disposed within the pump case 12 and is adapted with impeller blades 38 to accept fluids flowing into the pump case 12 via the suction opening 34 and discharging that fluid via the discharge opening 36 by centrifugal force. The impeller 14 is rotatable about the axis of the drive shaft 32 disposed through the central opening 30 in the rearward wall 26 of the pump case 12. The drive shaft 32 is typically driven by an electric motor (not shown).

The drive shaft 32 is sealed to the pump case 12 by a primary drive shaft seal 40 disposed around the central opening 30 of the rearward wall 26 of the pump case 12. The primary drive shaft seal 40 comprises a seal ring 70 which presses against a ceramic disk 72. The seal ring 70 is urged into sealing contact with the ceramic disk 72 by a spring 74.

Preferably, the pump case 12 further comprises a secondary drive shaft seal 76 disposed distal to the primary drive shaft seal 40. The secondary drive shaft seal 76 can be a resilient ring disposed around the drive shaft 32 and held in place by a retainer ring 78. The secondary drive shaft seal 76 can be made from any sealable resilient material, such as rubbers, synthetic rubbers and soft plastics. The secondary seal 76 has an opening slightly smaller than the outside diameter of the drive shaft 32 so that the secondary seal 76 closely adheres to the drive shaft 32 and acts as a "fail safe" seal to prevent the leakage of any water which would somehow seep past the primary drive shaft seal 40.

The impeller 14 has a center 42, a support wall 44 and the plurality of impeller blades 38. The support wall 44 has a forward side 46 and a rearward side 48.

The at least one groove 16 is defined in the rearward wall 26 of the pump case 12. The at least one groove 16 radiates outwardly from the drive shaft seal 40 and is adapted to carry liquids to and from the seal 40. Typically, the at least one groove 16 has at least one depth between about 0.06 inches and about 0.25 inches. Most typically, the depth of the groove is generally uniform and is between 0.06 inches and about 0.2 inches. Also, the at least one groove 16 has at least one width of between about 0.12 inches and about 0.2 inches. Most typically, the depth of the at least one groove 16 is generally uniform in width and is between 0.12 inches and about 0.4 inches wide.

Typically, the at least one groove 16 is a plurality of grooves 16. In the embodiment illustrated in the drawings, the at least one groove 16 comprises four grooves 16.

The at least one radial ridge 18 is disposed on the rearward side 48 of the support wall 44 of the impeller 14. The purpose of the at least one radial ridge 18 is to induce the flow of liquids within the at least one groove 16 to and from the drive shaft seal 40 to continuously wash out any precipitated chemicals around the drive shaft seal 42 and to cool the drive shaft seal 40.

Typically, the at least one radial ridge 18 has at least one height of between about 0.08 inches and about 0.2 inches. In a typical embodiment, the height of the at least one radial ridge 18 is generally uniform and is between about 0.08 inches and about 0.2 inches. Also, the at least one radial ridge 18 has at least one width of between about 0.13 inches and about 0.2 inches.

Typically, the at least one radial ridge 18 comprises a plurality of radial ridges 18. In the embodiment illustrated in the drawings, the at least one radial ridge 18 is comprised of three radiating ridges 18.

Typically, the at least one radial ridge 18 is arcuate and has a leading portion 50 disposed proximate to the center 42 of the impeller 14 and with a trailing portion 42 disposed distal from the center 42 of the impeller 44. Such a design can be found in the embodiment illustrated in the drawings. This design has been found to provide sufficient flow of liquid within the at least one groove 16 while minimizing unwanted turbulence between the impeller 14 and the rearward wall 26 of the pump case 12.

Preferably, the centrifugal pump 10 further comprises a flow guide 54 disposed within the pump case 12. The flow guide 54 may have a free edge 56. The flow guide 54 comprises a first baffle surface 57 and an attached second baffle surface 58. The first baffle surface 57 is arcuate and is considerably longer than the second baffle surface 58. The junction of the first baffle surface 57 and the second baffle surface 58 defines an angle a greater than 90°. The distance between the first baffle surface 57 and the impeller 14 is less than the distance between the side walls 28 of the pump case 12 and the impeller 14. By this design, flow of liquids between the impeller 14 and the flow guide 54 are somewhat inhibited. This results in an increased flow from the discharge opening 36 in the pump case 12.

In those embodiments having a flow guide 54, it is also preferable that the rearward wall 26 of the pump case 12 define a flow guide groove 60 which is sized and dimensioned to snugly accept the free edge 56 of the flow guide 54. Such flow guide groove 60 assures that the forward portion 20 of the pump case 12 is always properly aligned with the rearward portion 22 of the pump case 12.

The invention provides a centrifugal pump which successfully avoids the problems in other centrifugal pumps of precipitated chemical fouling around the drive shaft seal and heat related failures of the drive shaft seal. By the design of the invention, liquids within the pump case are continuously caused by the radial ridges to flow to and from the primary seal via the grooves. Such flow continuously rinses the primary seal with liquids to minimize the build-up of heat and the build-up of precipitated chemicals around the primary seal. The solution provided by the invention is inexpensive with respect to both manufacturing costs and maintenance costs.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A centrifugal pump comprising:
   (a) a pump case having a forward wall and a rearward wall, the rearward wall defining a central opening for a drive shaft;
   (b) a rotatable impeller disposed within the pump case, the impeller having a center, a support wall and impeller blades, the support wall having a forward side and a rearward side;
   (c) a drive shaft disposed throughout the central opening of the rearward wall of the pump case and attached to the rearward side of the impeller support wall for rotating the impeller;
   (d) a primary drive shaft seal disposed around the central opening of the rearward wall of the pump case to seal the drive shaft to the pump case;
   (e) at least one groove defined in the rearward wall of the pump case, the at least one groove radiating outwardly from the primary drive shaft seal to carry liquids to and from the primary drive shaft seal; and
   (f) at least one radial ridge disposed on the rearward side of the support wall of the impeller.

2. The centrifugal pump of claim 1 wherein the at least one groove is a plurality of grooves defined in the rearward wall of the pump case, each groove radiating outwardly from the primary drive shaft seal to carry liquids to and from the primary drive shaft seal.

3. The centrifugal pump of claim 1 wherein the at least one radial ridge comprises a plurality of radial ridges disposed on the rearward side of the support wall of the impeller.

4. The centrifugal pump of claim 1 wherein the at least one radial ridge comprises a plurality of radial ridges disposed on the rearward side of the support wall of the impeller, each of the radial ridges being arcuate with a leading portion disposed proximate to the center of the impeller and with a trailing portion disposed distal from the center of the impeller.

5. The centrifugal pump of claim 1 further comprising a secondary drive shaft seal, the secondary drive shaft seal comprising a resilient ring disposed around the drive shaft.

6. The centrifugal pump of claim 1 wherein the depth of the at least one groove is generally uniform and is between about 0.06 inches and 0.2 inches.

7. The centrifugal pump of claim 1 wherein the at least one groove has at least one width of between about 0.12 inches and 0.2 inches.

8. The centrifugal pump of claim 1 wherein the width of the at least one groove is generally uniform and is between about 0.12 inches and 0.4 inches.

9. The centrifugal pump of claim 1 wherein the at least one radial ridge has at least one height of between about 0.08 inches and 0.2 inches.

10. The centrifugal pump of claim 1 wherein the height of the at least one radial ridge is generally uniform and is between about 0.08 inches and 0.2 inches.

11. The centrifugal pump of claim 1 wherein the at least one radial ridge has at least one width of between about 0.13 inches and 0.2 inches.

12. The centrifugal pump of claim 1 further comprising a flow guide disposed within the pump case, the flow guide comprising a first baffle surface and an attached second baffle surface, the first baffle surface being arcuate and being longer than the second baffle surface, the junction of the first baffle surface and the second baffle surface defining an angle greater than 90°.

13. The centrifugal pump of claim 12 wherein the flow guide has a free edge and wherein the rearward wall of the pump case defines a flow guide groove sized and dimensioned to snugly accept the free edge of the flow guide and wherein the free edge of the flow guide is defined within the flow guide groove.

14. A centrifugal pump comprising:
   (a) a pump case having a forward wall and a rearward wall, the rearward wall defining a central opening for a drive shaft;

(b) a rotatable impeller disposed within the pump case, the impeller having a center, a support wall and impeller blades, the support wall having a forward side and a rearward side;

(c) a drive shaft disposed throughout the central opening of the rearward wall of the pump case and attached to the rearward side of the impeller support wall for rotating the impeller;

(d) a primary drive shaft seal disposed around the central opening of the rearward wall of the pump case to seal the drive shaft to the pump case;

(e) a plurality of grooves defined in the rearward wall of the pump case, each groove radiating outwardly from the primary drive shaft seal to carry liquids to and from the primary drive shaft seal;

(f) a plurality of radial ridges disposed on the rearward side of the support wall of the impeller; and (g) a secondary drive shaft seal comprising a resilient ring disposed around the drive shaft.

15. The centrifugal pump of claim 14 wherein each of the radial ridges is arcuate having a leading portion disposed proximate to the center of the impeller and having a trailing portion disposed distal from the center of the impeller.

16. The centrifugal pump of claim 14 further comprising a flow guide disposed within the pump case, the flow guide comprising a first baffle surface and an attached second baffle surface, the first baffle surface being arcuate and being longer than the second baffle surface, the junction of the first baffle surface and the second baffle surface defining an angle greater than 90°.

17. The centrifugal pump of claim 16 wherein the rearward wall of the pump case defines a flow guide groove sized and dimensioned to snugly accept the free edge of the flow guide and wherein the free edge of the flow guide is defined within the flow guide groove.

18. A centrifugal pump comprising:

(a) a pump case having a forward wall and a rearward wall, the rearward wall defining a central opening for a drive shaft;

(b) a rotatable impeller disposed within the pump case, the impeller having a center, a support wall and impeller blades, the support wall having a forward side and a rearward side;

(c) a drive shaft disposed throughout the central opening of the rearward wall of the pump case and attached to the rearward side of the impeller support wall for rotating the impeller;

(d) a primary drive shaft seal disposed around the central opening of the rearward wall of the pump case to seal the drive shaft to the pump case; and (e) a flow guide disposed within the pump case, the flow guide comprising a first baffle surface and an attached second baffle surface, the first baffle surface being arcuate and being longer than the second baffle surface, the junction of the first baffle surface and the second baffle surface defining an angle greater than 90°;

wherein the flow guide has a free edge and wherein the rearward wall of the pump case defines a flow guide groove sized and dimensioned to snugly accept the free edge of the flow guide and wherein the free edge of the flow guide is defined within the flow guide groove.

19. The centrifugal pump of claim 18 further comprising a secondary drive shaft seal, the secondary drive shaft seal comprising a resilient ring disposed around the drive shaft.

* * * * *